Figure 1:
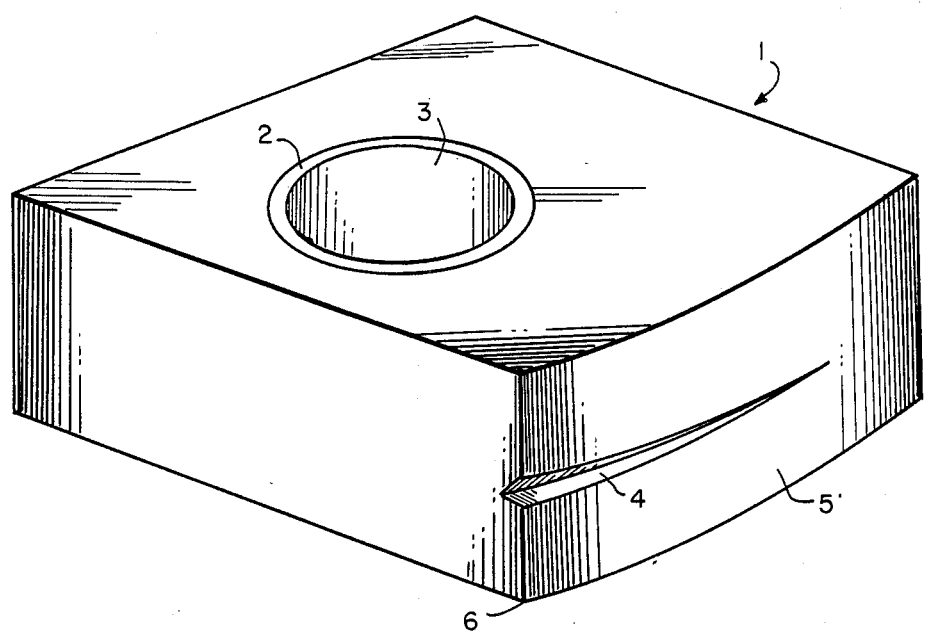
Figure 2:
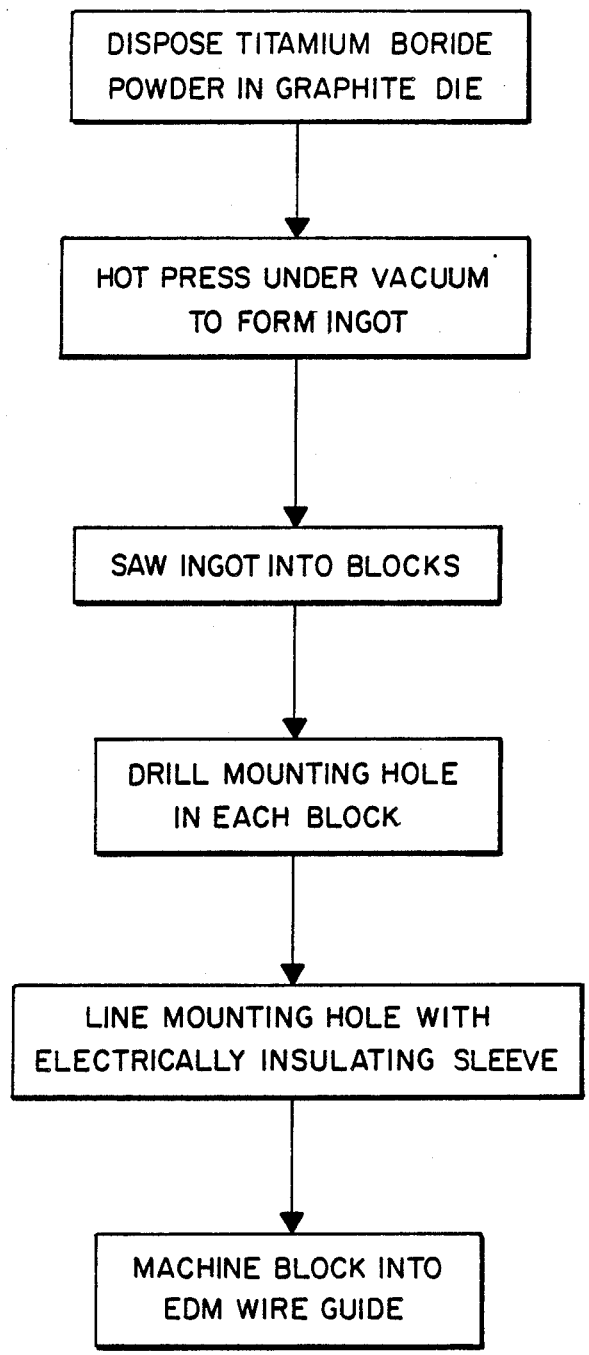

United States Patent [19]

Perreault et al.

[11] Patent Number: 4,937,414

[45] Date of Patent: Jun. 26, 1990

[54] WIRE GUIDE FOR ELECTRICAL DISCHARGE MACHINING APPARATUS

[76] Inventors: David J. Perreault, 1 Scammon La., Exeter, N.H. 03833; Arun K. Chaudhuri, 704 McKeithan Rd., Florence, S.C. 29501; Roy White, 108 Linden St., Exeter, N.H. 03833; Richard A. Harris, 110 Lafayette Rd., Hampton Falls, N.H. 03844

[21] Appl. No.: 242,996

[22] Filed: Sep. 12, 1988

[51] Int. Cl.⁵ .................. B23H 7/10; B28B 11/12
[52] U.S. Cl. .................................. 219/69.12; 264/67
[58] Field of Search .............. 76/4, 107 R, 107 A; 75/243, 244, 254; 72/467; 219/69 W, 69 E, 69.12, 69.15, 69.17; 29/DIG. 31; 425/79; 264/67

[56] References Cited

U.S. PATENT DOCUMENTS

| | | | |
|---|---|---|---|
| 3,003,885 | 10/1961 | Mandorf, Jr. | 264/332 |
| 3,621,527 | 11/1971 | Michalak | 264/67 |
| 3,954,419 | 5/1976 | Kaufman et al. | 75/244 |
| 4,030,919 | 6/1977 | Lea, III | 426/79 |
| 4,097,567 | 6/1978 | Cebulak et al. | 501/98 |
| 4,246,027 | 1/1981 | Watanabe et al. | 75/244 |
| 4,303,442 | 12/1981 | Hara et al. | 72/467 |
| 4,613,740 | 9/1986 | Ichikawa | 219/69 W |
| 4,803,328 | 2/1989 | Obara | 219/69 W |
| 4,812,280 | 3/1989 | Moorhead et al. | 264/332 |

FOREIGN PATENT DOCUMENTS

| | | | |
|---|---|---|---|
| 2343680 | 4/1975 | Fed. Rep. of Germany | 264/332 |
| 55-18508 | 2/1980 | Japan | 75/244 |
| 124826 | 6/1987 | Japan | 219/69.17 |

Primary Examiner—A. D. Pellinen
Assistant Examiner—Geoffrey S. Evans
Attorney, Agent, or Firm—James Theodosopoulos

[57] ABSTRACT

A wire guide for EDM machining apparatus comprises a vacuum hot pressed titanium diboride block having a groove on a curved side of the block for positioning EDM wire. The block has a mounting hole therethrough lined with an electrically insulating sleeve.

2 Claims, 2 Drawing Sheets

WIRE GUIDE FOR ELECTRICAL DISCHARGE MACHINING APPARATUS

This invention is concerned with wire guides used in EDM machining. Some such guides are disclosed in U.S. Pat. Nos. 4,317,019, 4,333,806, 4,414,457, 4,436,975, 4,448,655, 4,507,532 and 4,618,761.

A wire guide in accordance with this invention is made of sintered titanium diboride. Such a wire guide is hard and wear resistant, and is less expensive than diamond or sapphire wire guides.

In one example of a wire guide in accordance with this invention, titanium diboride powder having a FSSS particle size of about 1.5 to 2.5 microns was loaded into a graphite die with assembled graphite punches on the top and bottom. The titanium diboride powder was heated to 2000°C. in a vacuum hot press chamber, and then hot pressed at 3800 psi under a vacuum of $3 \times 10^{-4}$ torr. After cooling, the ingot was removed and diamond sawed into blocks from which wire guide parts were finish machined by means of surface grinding and core drilling using diamond tools.

The single figure in the drawing is an isometric view of a wire guide in accordance with this invention.

Wire guide 1 comprises a six sided titanium diboride block. Because titanium diboride is electrically conducting, wire guide 1 must be electrically insulated from the EDM apparatus in which it is mounted. Accordingly, an electrically insulating sleeve 2, made, for example, of rubber, is lined within mounting hole 3 of wire guide 1 in order to insulate wire guide 1 from a mounting rod (not shown) through mounting hole 3. Insulating sheets, not shown, may be placed on mounting surfaces of wire guide 1 to electrically insulate wire guide 1 from the EDM apparatus on which it is mounted.

There is a groove 4 on a curved side 5 of the block in which the EDM wire rides during EDM machining. Groove 4 extends from edge 6 of the block part way down curved side 5, groove 4 being deepest at edge 6. During EDM machining, EDM wire rides in groove 4 at edge 6. This permits close control of the positioning of the EDM wire for accurate machining purposes.

In one example, wire guide 1 was 313 mils thick by 625 mils wide. It was 627 mils long on the upper surface which included edge 6 and 528 mils long at the opposite surface. Mounting hole 3 was 256 mils diameter. V shaped groove 4 was 45 mils deep at edge 6 and was parallel to the opposite surface; thus groove 4 terminated about half way down curved side 5.

We claim:

1. An EDM wire guide comprising a sintered titanium diboride six sided block having a mounting hole therethrough with an electrically insulating sleeve lining said hole, one of the six sides of the titanium diboride block being curved and having a groove therein for accurately positioning EDM wire during machining, the groove extending from one edge of said one of the six sides part way down the curved side, the groove being deepest at said edge.

2. The method of making a wire guide for EDM machining apparatus comprising the steps of disposing titanium diboride powder in a graphite die with assembled graphite punches at the top and bottom; hot pressing the titanium diboride powder under vacuum to form a sintered ingot; sawing the ingot into blocks; drilling a mounting hole in each block; lining the mounting hole with an electrically insulating sleeve; and machining the blocks into EDM wire guides.

* * * * *